(12) United States Patent
Man

(10) Patent No.: US 9,460,845 B2
(45) Date of Patent: Oct. 4, 2016

(54) TRANSFORMER AND STROBE DEVICE

(71) Applicants: Nissin Industries LTD, North Point (CN); Chikara Goto, Tokyo (JP)

(72) Inventor: Chun Nin Man, North Point (CN)

(73) Assignees: NISSIN INDUSTRIES LTD., Hong Kong (CN); CHIKARA GOTO, Tokyo (JP)

( * ) Notice: Subject to any disclaimer, the term of this patent is extended or adjusted under 35 U.S.C. 154(b) by 86 days.

(21) Appl. No.: 14/423,784

(22) PCT Filed: Aug. 20, 2013

(86) PCT No.: PCT/JP2013/004914
§ 371 (c)(1),
(2) Date: Feb. 25, 2015

(87) PCT Pub. No.: WO2014/034044
PCT Pub. Date: Mar. 6, 2014

(65) Prior Publication Data
US 2015/0206648 A1  Jul. 23, 2015

(30) Foreign Application Priority Data
Aug. 31, 2012  (JP) .................. 2012-191969

(51) Int. Cl.
H01F 27/32  (2006.01)
H01F 27/28  (2006.01)
G03B 15/05  (2006.01)
(Continued)

(52) U.S. Cl.
CPC ............. *H01F 27/325* (2013.01); *G03B 15/05* (2013.01); *H01F 27/2828* (2013.01); *H01F 27/29* (2013.01); *H01F 27/324* (2013.01); *H01J 61/56* (2013.01); *H01J 61/80* (2013.01); *H01F 2005/025* (2013.01)

(58) Field of Classification Search
CPC ............................. H01F 27/22; H01F 27/325
USPC .......................................... 336/220
See application file for complete search history.

(56) References Cited

U.S. PATENT DOCUMENTS

2002/0011914 A1\* 1/2002 Ikeura ................... H01F 27/325
336/208
2010/0321141 A1\* 12/2010 Chen ....................... H01F 29/10
336/131
(Continued)

FOREIGN PATENT DOCUMENTS

DE  19521070 A1  12/1995
JP  54026735  3/1979
(Continued)

OTHER PUBLICATIONS

International Search Report PCT/JP2013/004914, dated Oct. 22, 2013.
(Continued)

*Primary Examiner* — Don Le
(74) *Attorney, Agent, or Firm* — Dority & Manning, P.A.

(57) ABSTRACT

To prevent a transformer such as a trigger transformer from becoming unable to perform transformation as designed due to short circuits caused by leakage of an insulating wax or the like even when the temperature of the transformer becomes high, a sealed chamber is formed in an outer bobbin which accommodates a secondary winding by a sealing member and the sealed chamber is filled with an insulating wax.

4 Claims, 2 Drawing Sheets

(51) Int. Cl.
*H01F 27/29* (2006.01)
*H01J 61/56* (2006.01)
*H01J 61/80* (2006.01)
*H01F 5/02* (2006.01)

(56) References Cited

U.S. PATENT DOCUMENTS

2011/0254651 A1* 10/2011 Won ............... H01F 27/22 336/220
2014/0139313 A1* 5/2014 Zhou ............... B65H 75/14 336/84 C

FOREIGN PATENT DOCUMENTS

| JP | 61079215 A | 4/1986 |
|---|---|---|
| JP | 62111405 A | 5/1987 |
| JP | H01144605 A | 6/1989 |
| JP | H0582369 | 2/1993 |
| JP | H09330823 A | 12/1997 |
| JP | H10214733 A | 8/1998 |
| JP | 2000124040 A | 4/2000 |
| JP | 2003297652 A | 10/2003 |
| JP | 2005-322799 A | 11/2005 |

OTHER PUBLICATIONS

Microfilm of the specification and drawings annexed to the request of Japanese Utility Model Application No. 026735/1979 (Laid-open No. 126609/1980) (Kijima Musen Kabushiki Kaisha, Sep. 8, 1980, specification, p. 1, line 11 to p. 2, line 2: fi9. 1. (Family: none).
Microfilm of the specification and drawings annexed to the request of Japanese Utility Model Application No. 184509/1986 (Laid-open No. 089225/1988) (Tokyo Electric Co., Ltd), Jun. 10, 1988, specification, p. 2, line 14 to p. 3, line 2; fig. 1, 3. (Family: none).

* cited by examiner

TRANSFORMER AND STROBE DEVICE

TECHNICAL FIELD

The present invention relates a transformer and a strobe device, and more specifically to a trigger transformer to be used in a trigger circuit of a strobe device.

BACKGROUND ART

A trigger transformer (transformer) to be used in a trigger circuit of a strobe device is known in which a secondary conductor (secondary coil) is formed around an outer circumference of a bobbin, a primary conductor (primary coil) is formed to surround the second conductor via an insulating film, and a core member is placed in the bobbin (see Patent Document 1, for example).

BRIEF SUMMARY OF THE INVENTION

In a case where the primary conductor and the secondary conductor are each constructed as a coil formed by winding an insulation-coated conductive wire, in order to avoid the neighboring portions of the insulation-coated conductive wire from forming short circuits even if an insulating coating is peeled off from the insulation-coated conductive wire, it is considered to impregnate the coils serving as the primary conductor and secondary conductor with an insulating wax to thereby ensure electric insulation of the coils.

As the insulating wax, a wax with a high melting point is used to prevent the melting thereof even, if the coils generate heat somewhat. However, if the light emission of the strobe device is repeated more than expected, for example, the load of the trigger transformer may increase and the temperature of the coils may become high to such a degree that the wax is melted and leaks from the coils, whereby the function of the wax of electrically insulating the coils may be lost. In such a case, the insulation breakdown between portions of the insulation-coated conductive wires of the coils generates short circuits and this prevents the trigger transformer from performing transformation as designed, and thus, prevents the strobe device from performing light emission normally.

The task to be accomplished by the present invention is to prevent the transformer such as a trigger transformer from becoming unable to perform transformation as designed due to electric short circuits caused by leakage of the insulating wax or the like even if the load of the transformer is increased and thereby the temperature of the transformer becomes high, such as when the light emission of the strobe device is repeated more than expected.

A transformer according to the present invention includes: a first bobbin (100) which has an electrical insulation property and which has a tube shape having at least one open end; a primary winding (108) provided around an outer circumference of the first bobbin (100); a core member (120) and a secondary winding (118) located in the first bobbin (100); a sealing member (126) which closes the open end (100A) of the first bobbin (100) such that a sealed chamber (113) is formed in the first bobbin (100) in which the core member (120) and the secondary winding (118) are located; and an electrical insulating material (130) filled in the sealed chamber (113).

According to this structure, since the sealing member (126) forms a sealed chamber (113) in the first bobbin (100) in which the secondary winding (118) is accommodated, and the sealed chamber (113) is filled with the electrical insulating material (130), even when the temperature of the secondary winding (118) becomes high, the electrical insulating material (130) does not leak externally from the space where the secondary winding (118) is located, namely, from the sealed chamber (113). Thereby, even when the temperature of the secondary winding (118) becomes high, it is ensured that the electrical insulating material (130) electrically insulates the secondary winding (118), and thus, electrical short circuits due to insulation breakdown between portions of the insulation-coated conductive wire of the secondary winding (118) is prevented and the transformer performs transformation as designed.

In the transformer according to the present invention, preferably, a conductive rod member (124) serving as an electrode is fixed at an end of the core member (120), an end of the secondary winding (118) is conductively connected with the rod member (124), and the rod member (124) passes through the sealing member (126) so as to be externally exposed.

According to this structure, even if the secondary winding (118) is formed of a relatively thin insulation-coated conductive wire, it is ensured that the connection of the secondary winding (118) to terminals is performed easily and securely.

In the transformer according to the present invention, preferably, a second bobbin (110) is provided in the first bobbin (100), the second bobbin (110) has an electrical insulation property and has a tube shape, the secondary winding (118) is provided around an outer circumference of the second bobbin (110), and the core member (120) is provided in the second bobbin (110).

According to this structure, the winding process for the primary winding (108) and the winding process for the secondary winding (118) can be performed separately, and thus, by preparing a plurality of kinds of second bobbins (110) with different numbers of turns of the secondary winding (118), it is possible to easily manufacture transformers having different turn ratios with high productivity.

In a strobe device according to the present invention, the transformer according to the present invention as described above is employed as a trigger transformer (52) in a trigger circuit (48).

According to the transformer of the present invention, since the sealing member forms a sealed chamber in the first bobbin in which the secondary winding is accommodated, and the sealed chamber is filled with the electrical insulating material, even when the temperature of the secondary winding becomes high, the electrical insulating material does not leak externally from the space where the secondary winding is located.

DETAILED DESCRIPTION OF THE INVENTION

Figure 1:
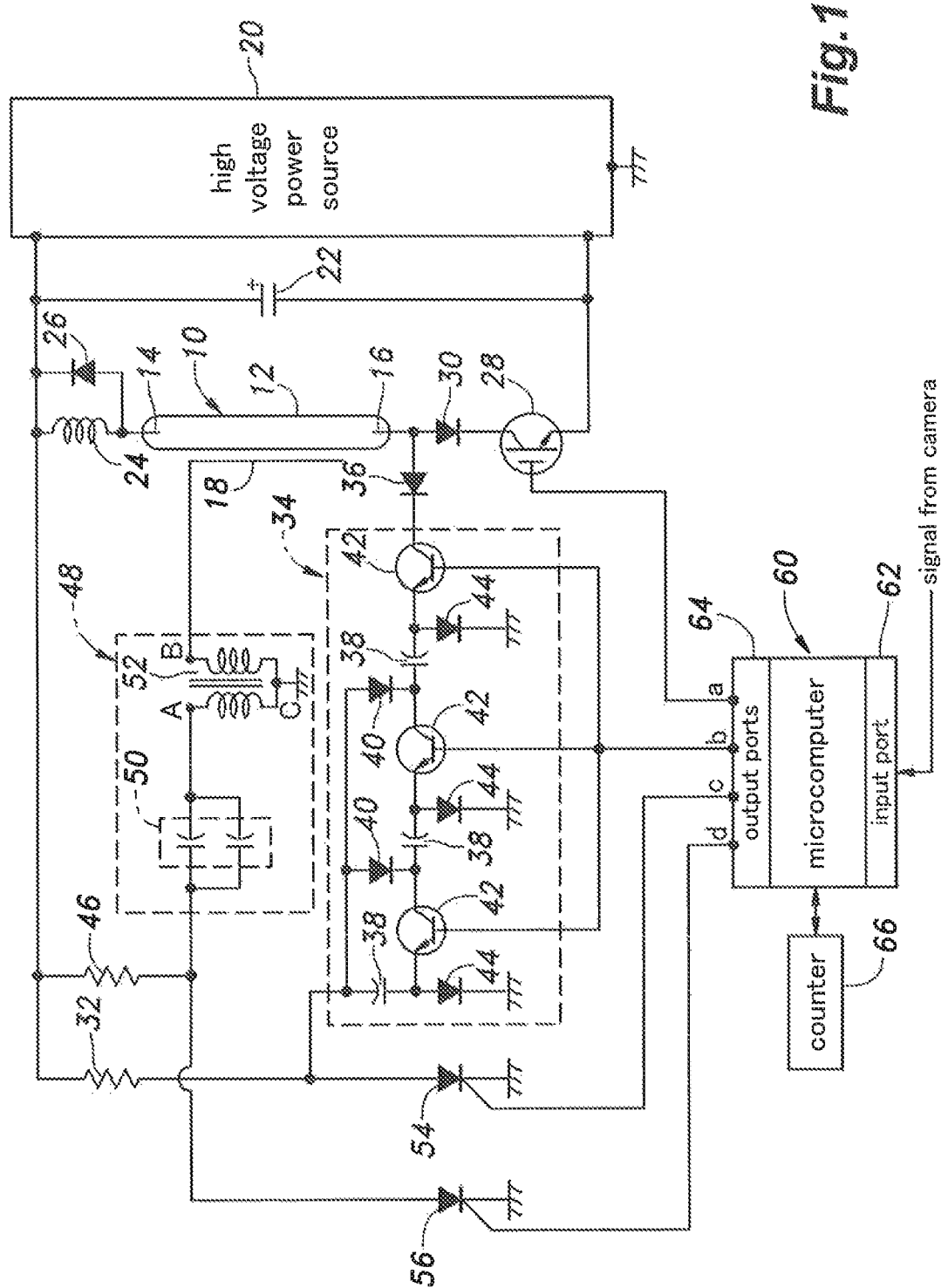
FIG. 1 is an electric circuit diagram of an embodiment of a strobe device in which a transformer according to the present invention is used as a trigger transformer in a trigger circuit.

Now, an embodiment of a strobe device in which a transformer according to the present invention is employed as a trigger transformer of a trigger circuit will be described with reference to FIG. 1.

The strobe device according to the present embodiment includes a xenon discharge tube 10 as a flash discharge tube. The xenon discharge tube 10 includes an elongated glass tube 12, a pair of discharge electrodes 14 and 16 respectively serving as an anode and a cathode provided on either longitudinal end of the glass tube 12 and a trigger electrode 18 provided on the outside of an intermediate part of the glass tube 12, In order for the xenon discharge tube 10 to withstand the thermal stress caused by the repeated lighting of the xenon discharge tube 10 over a prolonged period of time, the glass tube 12 is made of quartz glass, and the electron emission material of the cathode includes barium.

The strobe device further includes a high voltage power source 20 which may have a known structure and which includes a DC power source consisting of a battery, etc. and a power source voltage booster typically including a boosting transformer and a DC-DC converter for producing a high DC voltage of 300 to 350 volts.

The output end of the high voltage power source 20 is connected to a main capacitor 22 which is provided with a large capacity and which stores the high voltage electric charges supplied by the high voltage power source 20. Namely, the main capacitor 22 is charged by the high voltage power source 20.

The positive end of the main capacitor 22 is connected to the anode-side discharge electrode 14 of the xenon discharge tube 10 via a parallel circuit of a choke coil 24 and a diode 26. The negative end of the main capacitor 22 is connected to the cathode-side discharge electrode 16 of the xenon discharge tube 10 via a series circuit of an IGBT (insulated Gate Bipolar Transistor) 28 serving as a light intensity adjusting switching device and a diode 26. The main capacitor 22 applies a discharge voltage (which was originally supplied from the high voltage power source 20) to the anode-side discharge electrode 14 and the cathode-side discharge electrode 16 of the xenon discharge tube 10 in response to the turning on of the IGBT 28. Therefore, by adjusting the time duration of the switching on of the IGBT 28, the amount of flash light emitted from the xenon discharge tube 10 ranging from a small amount of flash light can be adjustably set in a quantitative manner.

The output end of the high voltage power source 20 is connected to a booster circuit 34 via a resistor 32. The booster circuit 34 includes a plurality (three, in the present embodiment) of booster capacitors 38, a parallel circuit for charging the booster capacitors 38 which connects ends of the three booster capacitors 38 to the power source in parallel with use of two diodes 40, three switching transistors 42 which selectively form a series circuit of the three booster capacitors 38 for discharging the booster capacitors 38 and three diodes 44 which connect each booster capacitor 38 to ground. The output end of the third switching transistor 42 is connected to the cathode-side discharge electrode 16 via a diode 36. If the number of the booster capacitors 38 is n, the booster circuit 34 is able to increase the high DC voltage of the high voltage power source 20, i.e., discharge voltage, by the factor of (1+n). In the present embodiment, as there are three booster capacitors 38, a boosted voltage four times the high DC voltage of the high voltage power source 20 (which may be in the order of 1,200 to 1,400 volts) can be obtained.

The timing for applying the discharge voltage boosted by the booster circuit 34 across the anode-side discharge electrode 14 and the cathode-side discharge electrode 16 of the xenon discharge tube 10 is defined by the timing when a booster circuit switching element 54 composed of a thyristor, etc. is turned on.

The output end of the high voltage power source 20 is further connected to a trigger electrode 18 of the xenon discharge tube 10 via a resistor 46 and a trigger circuit 48. The trigger circuit 48 includes a trigger capacitor 50 consisting of a plurality (two, in the present embodiment) of capacitors connected in parallel to one another and a trigger transformer 52 connected in series to the trigger capacitor 50. The trigger circuit 48 generates the trigger voltage to be applied to the trigger electrode 18.

The timing when the trigger circuit 48 starts applying the trigger voltage to the trigger electrode 18 is defined by the timing when a trigger switching element 56 composed of a thyristor, etc, is turned on.

Namely, the booster circuit switching element 54 which defines the timing when the booster circuit 34 begins applying the boosted discharge voltage across the anode-side discharge electrode 14 and the cathode-side discharge electrode 16 of the xenon discharge tube 10, and the trigger switching element 56 which defines the timing when the trigger circuit 48 begins applying the trigger voltage to the trigger electrode 18 are provided separately.

The IGBT 28, three switching transistors 42, booster circuit switching element 54 and trigger switching element 56 are each turned on or off by a gate voltage, and the gate voltage of each element is controlled by a microcomputer 60 serving as a controller. Namely, each of these elements is turned on or off by one of signals a to d output from output ports 64 of the microcomputer 60. The IGBT 28, three switching transistors 42, booster circuit switching element 54 and trigger switching element 56 are independently turned on or off (switched between a high level and a low level) by the signals a to d, respectively.

The microcomputer 60 receives the signal from a camera connected to the strobe device through an input port 62. The signal from the camera may consist of a signal indicating the pressing of a shutter button serving as a synchronous signal, a TTL (Through the Lens) signal, a signal produced by the operation of the shutter of the camera, etc. The microcomputer 60 receives the signal from the camera, count the time by use of a counter 66 and produces output signals a to d according to prescribed timings to control the light emission (flash) of the xenon discharge tube 10.

Upon receiving a signal indicating the pressing of the shutter button, the microcomputer 60 turns signal a to a high level, thereby turning on the IGBT 28. As a result, the voltage of the main capacitor 22 is applied as a discharge voltage across the anode-side discharge electrode 14 and the cathode-side discharge electrode 16 of the xenon discharge tube 10.

The counter 66 starts time counting upon receiving the shutter button pressing signal, and upon reaching a count number C1, signal b is turned to a high level, thereby turning on the three switching transistors 42 and connecting the three booster capacitors 38 all in series. At the same time, signal c is turned to a high level, and this causes the discharge voltage to be boosted by the booster circuit 34 and applied across the anode-side discharge electrode 14 and the cathode-side discharge electrode 16 of xenon discharge tube 10.

By applying the boosted, high discharge voltage across the anode-side discharge electrode 14 and the cathode-side discharge electrode 16 of the xenon discharge tube 10, the ionization in the glass tube 12 is promoted, and the higher the boosted discharge voltage generated by the booster circuit 34 is, the more vigorously this ionization is promoted.

It is to be noted that the count number C1 may be determined depending on the variations in the properties of the IGBT 28, and is not necessarily indispensable.

The counter 66 is reset and starts counting the time anew when signal c has turned to the high level. When the count number of the counter 66 reaches C2, signal d is turned to a high level, thereby causing the trigger voltage generated by the trigger circuit 48 to be applied to the trigger electrode 18. Thus, the start of the application of the trigger voltage to the trigger electrode 18 is delayed with respect to the start of the boosting performed by the booster circuit 34 by a time interval which corresponds to the count number C2. This time delay may be in the range of 3 to 5 microseconds.

The xenon discharge tube 10 starts emitting flash light with a small time delay from the time point of applying the trigger voltage.

Signals b, c and d are each turned from the high level to the low level after a predetermined time of a few microseconds from the time of turning to the high level. In a pre-flash performed before the shutter is opened, signal a is turned from the high level to the low level when a predetermined time period has elapsed from the time of turning to the high level, so that the IGBT 28 is turned off. This completes the pre-flash process.

Upon completion of the pre-flash, when the time defined by the count number C3 of the counter 66 has elapsed, signal a is turned to the high level thereby turning on the IGBT 28. As a result, the voltage of the main capacitor 22 is applied as a discharge voltage across the anode-side discharge electrode 14 and the cathode-side of the discharge electrode 16 of the xenon discharge tube 10.

In a case of a main flash also, which is performed while the shutter of the camera is open after the pre-flash, signals b, c and d change at the same timing as the case of the pre-flash, and the start of the application of the trigger voltage to the trigger electrode 18 is delayed with respect to the start of the boosting performed by the booster circuit 34 by a time interval which corresponds to the count number C2, in the case of the main flash, signal a changes from the high level to the low level when an amount of light emitted from the xenon discharge tube 10 reaches a prescribed amount of emitted light calculated based on a TTL on the camera, Whereby the IGBT 28 is turned off to finish the main flash.

In the cases of both the pre-flash and main flash, since the start of the application of the trigger voltage to the trigger electrode 18 is delayed with respect to the start of the boosting performed by the booster circuit 34 by a predetermined time, the application of a high discharge voltage boosted by the booster circuit 34 sufficiently promotes the ionization in the glass tube 12 while the start of the application of the trigger voltage is delayed, and thus, the trigger voltage is applied after an ionized state is stabilized to cause the xenon discharge tube 10 to start the light emission.

Figure 2:
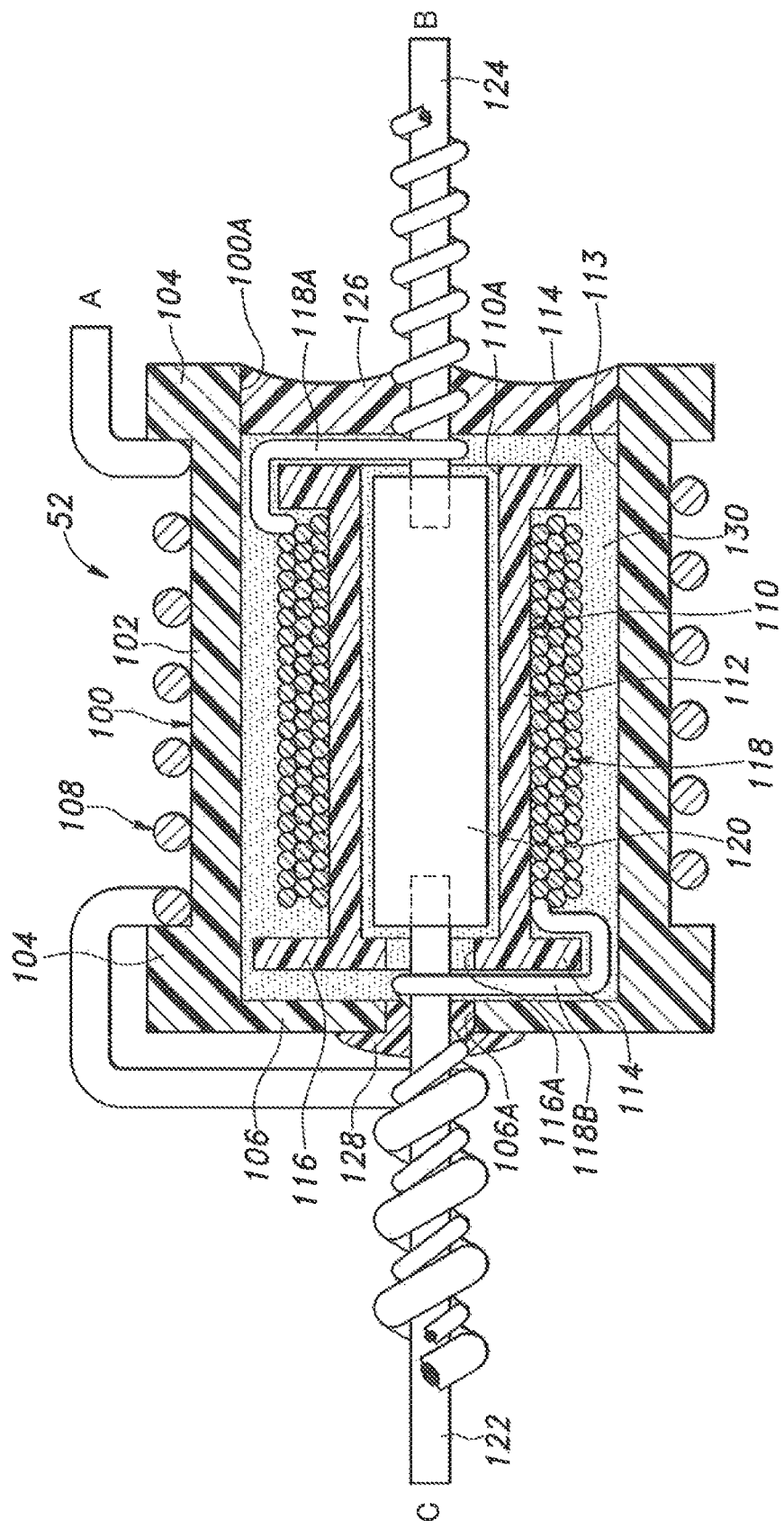
FIG. 2 is a cross sectional view showing an embodiment of the transformer according to the present invention.

Now, an embodiment of the trigger transformer 52 will be described with reference to FIG. 2.

The trigger transformer 52 includes an outer bobbin (first bobbin) 100. The outer bobbin 100 is a resin molded product made of an electrical insulating material such as PC (polycarbonate). The outer bobbin 100 includes a cylindrical part 102, annular side flanges 104 each extending radially outward from either end of the cylindrical part 102, and an end wall part 106 which closes one of the ends of the cylindrical part 102, and thus, the outer bobbin 100 has a cylindrical shape which has a closed end and an open end.

An outer circumference of the cylindrical part 102 located between the side flanges 104 is provided with a primary winding 108 formed by winding a relatively thick insulation-coated conductive wire. The primary winding 108 may be formed by winding the insulation-coated conductive wire with regular intervals as shown in the drawing, namely by winding the insulation-coated conductive wire such that neighboring portions of the insulation-coated conductive wire do not contact each other.

An inner bobbin (second bobbin) 110 is located in the cylindrical part 102 coaxially thereto. The inner bobbin 110 is a resin molded product made of an electrical insulating material such as PC (polycarbonate). The inner bobbin 110 includes a cylindrical part 112, annular side flanges 114 each extending radially outward from either end of the cylindrical part 112, and an end wall part 116 which closes one of the ends of the cylindrical part 112, and thus, the inner bobbin 110 has a cylindrical shape which has a closed end and an open end.

An outer circumference of the cylindrical part 112 located between the side flanges 114 is provided with a secondary winding 118 formed by winding a relatively thin insulation-coated conductive wire. It is to be noted that the number of turns of the secondary winding 118 is larger than the number of turns of the primary winding 108, and that the ratio of these numbers of turns is determined according to the necessary trigger voltage.

Since an outer diameter of the side flange 114 is smaller than an inner diameter of the cylindrical part 102, the inner bobbin 110, which is treated as a sub assembly having the secondary winding 118 wound around the cylindrical part 112, can be inserted into the cylindrical part 102 front an opening (open end) 100A at one end of the outer bobbin 100 until the inner bobbin 110 abuts the end wall part 106. It is to be noted that an inner diameter of the opening 100A is equal to the inner diameter of the cylindrical part 102.

A columnar ferrite core (core member) 120 is located in the cylindrical part 112. Since an outer diameter of the ferrite core 120 is smaller than the inner diameter of the cylindrical part 112, the ferrite core 120 can be inserted into the cylindrical part 112 from an opening 110A at one end of the cylindrical part 112 until the ferrite core 120 abuts the end wall part 116. Since an axial length of the inner bobbin 110 is shorter than an axial length of the cylindrical part 112, the inner bobbin 110 is entirely accommodated in the cylindrical part 112.

Relatively thick rod members 122 and 124 each formed of a conductive material such as a metal are fixed at either end of the ferrite core 120. The rod members 122 and 124 constitute electrodes and linearly extend in the axially outward directions from respective ends of the ferrite core 120. One rod member 122 protrudes outward from one end (left end, as seen in FIG. 2) of the outer bobbin 100 by passing through an aperture 116A formed at a central portion of the end wall part 116 of the inner bobbin 110 and an aperture 106A formed at a central portion of the end wall part 106 of the outer bobbin 100. The other rod member 124 protrudes outward from the other end (right end, as seen in FIG. 2) of the outer bobbin 100 by passing through the opening 110A of the inner bobbin 110 and the opening 100A of the outer bobbin 100.

The opening 100A and aperture 106A of the outer bobbin 100 are tightly closed by sealing members 126 and 128, respectively, which are formed of a potting material such as an epoxy resin, whereby an airtight sealed chamber 113 is formed in the cylindrical part 112. The sealed chamber 113 accommodates the inner bobbin 110 provided with the secondary winding 118 and the ferrite core 120.

The sealed chamber 113 is filled with an insulating wax 130 having a high melting point such as a micro wax as an electrical insulation material. The filling of the insulating wax 130 is performed by pouring a melted wax material into the cylindrical part 112 through the yet unclosed opening 100A while the aperture 106A has been closed by the sealing member 126 and closing the opening 100A by the sealing member 128 after the pouring of the wax material. The opening 100A may be closed by the sealing member 128 after the wax material has solidified.

Next, the structures of terminals of the primary winding 108 and the secondary winding 118 will be described.

One end 108A of the primary winding 108 extends outward from the outer bobbin 100 to serve as a primary terminal A. The other end 108B of the primary winding 108 extends along the outer surface of one end of the outer bobbin 100 to reach the rod member 122 and is wound around the outer circumference of the rod member 122 such that the other end 108B of the primary winding 108 is electrically connected to the rod member 122 by soldering.

One end 118A of the secondary winding 118 extends along the outer surface of one end of the inner bobbin 110 to reach the rod member 124 and is wound around the outer circumference of the rod member 124 such that one end 118A of the secondary winding 118 is electrically connected to the rod member 124 by soldering, whereby the rod member 124 serves as a secondary terminal B. The other end 118B of the secondary winding 118 extends along the outer surface of the other end of the inner bobbin 110 to reach the other rod member 122 and is be wound around the outer circumference of the rod member 122 such that the other end 118B of the secondary winding 118 is electrically connected to the rod member 122 by soldering, whereby the rod member 122 serves as a common ground terminal C for the primary winding 108 and the secondary winding 118.

The rod member 122, with the other end 118B of the secondary winding 118 wound thereon, passes through the sealing member 128 in an airtight fashion so as to be exposed externally from the outer bobbin 100. The rod member 124, with the one end 118A of the secondary winding 118 wound thereon, penetrates the sealing member 126 in an airtight fashion so as to be exposed externally from the outer bobbin 100.

According to the trigger transformer 52 having the structure described above, since the sealing members 126 and 128 form the sealed chamber 113 in the outer bobbin 100 in which the inner bobbin 110 with the secondary winding and the ferrite core 120 are accommodated, and the sealed chamber 113 is filled with the insulating wax 130 having a high melting point such as a micro wax, even when the strobe device repeats the light emission more than expected and increases the load of the trigger transformer whereby the temperature of the secondary winding 118 becomes high and the insulating wax 130 is melted, the insulating wax 130 does not leak externally from a space where the secondary winding 118 is located, namely, from the sealed chamber 113.

Therefore, even when the temperature of the secondary winding 118 becomes high, it is ensured that the insulating wax 130 electrically insulates the secondary winding 118, and thus, electrical short circuits due to insulation breakdown between portions of the insulation-coated conductive wire of the secondary winding 118 is prevented and the transformer 52 performs transformation as designed. As a result, even if the light emissions are repeatedly performed more than expected, each light emission is normally performed.

The secondary winding 118 formed of a relatively thin insulation-coated conductive wire is connected to the relatively thick rod members 122 and 124 fixed to the ferrite core 120, and the rod members 122 and 124 pass through the sealing members 126 and 128 in an airtight fashion so as to extend externally, such that these rod members 122 and 124 serve as the ground terminal C and secondary terminal B, respectively. Thus, although the secondary winding 118 is formed of a relatively thin insulation-coated conductive wire, it is ensured that the connection of the secondary winding 118 to the terminals can be performed easily and securely.

The outer bobbin 100 serves as an outer case which accommodates the inner bobbin 110 with the secondary winding and the ferrite core 120, and thus, it is possible to reduce the number of parts and the size of the trigger transformer 52.

Since the bobbin for the primary winding 108 and the bobbin for the secondary winding 118 are provided separately as the outer bobbin 100 and the inner bobbin 110, respectively, it is ensured that the primary winding 108 and the secondary winding 118 are electrically insulated from each other, and furthermore, the winding process of the primary winding 108 and the winding process of the secondary winding 118 can be performed separately, and thus, by preparing a plurality of kinds of inner bobbins 110 with different number of turns of the secondary winding 118, it is possible to easily manufacture transformers having different turn ratios with high productivity.

Although the present invention has been described in terms of one embodiment thereof, it is obvious to a person skilled in the art that the present invention is not limited to such an embodiment, and various alterations and modifications are possible without departing from the scope of the present invention.

For example, the shapes of the outer bobbin 100 and the inner bobbin 110 are not limited to cylindrical shapes, but the outer bobbin 100 and the inner bobbin 110 may have square tube shapes, etc.

The outer bobbin 100 may be a tube body which has openings on both ends where the openings are dimensioned to allow the inner bobbin 110 to be inserted in the outer bobbin 100 from either side, and each opening is to be closed by a sealing member consisting of a material such as an epoxy resin.

The primary winding 108 may be formed by etching, printing, etc. other than being formed of an insulation-coated conductive wire. The inner bobbin 110 may be omitted and the secondary winding 118 may be formed on the outer circumference of the ferrite core 120.

The electrical insulating material for filling the sealed chamber 113 is not limited to the insulating wax 130, but may be a material such as an insulating oil.

The insulating coating for the primary winding 108 may be achieved by a tape, a film or a case.

The transformer according to the present invention is not only usable as the trigger transformer 52 for a strobe device, but may be used as a transformer for a variety of electronic devices.

It is to be noted that not all the structural components in the embodiment described above are necessarily indispensable, but they may be selectively used without departing from the spirit of the present invention.

The contents of the original Japanese patent application (patent application No. JP2012-191969 filed on Aug. 31, 2012) on which the Paris Convention priority claim is made for the present application is incorporated herein by reference in its entirety.

GLOSSARY 10 xenon discharge tube
14 anode-side discharge electrode
16 cathode-side discharge electrode
18 trigger electrode
20 high voltage power source
22 main capacitor
28 IGBT
34 booster circuit
38 booster capacitor
42 switching transistor
48 trigger circuit
50 trigger capacitor
52 trigger transformer
54 booster circuit switching element
56 trigger switching element
60 microcomputer
66 counter
100 outer bobbin
108 primary winding
110 inner bobbin
111 seated chamber
118 secondary winding
120 ferrite core
122 rod member
124 rod member
126 seating member
128 sealing member
130 insulating wax

The invention claimed is:

1. A transformer comprising:
a first bobbin which has an electrical insulation property and which has a tube shape having at least one open end;
a primary winding provided around an outer circumference of the first bobbin;
a core member and a secondary winding located in the first bobbin;
a sealing member which closes the open end of the first bobbin such that a sealed chamber is formed in the first bobbin in which the core member and the secondary winding are located; and
an electrical insulating material filled in the sealed chamber.

2. The transformer according to claim 1, wherein a conductive rod member serving as an electrode is fixed at an end of the core member, wherein an end of the secondary winding is conductively connected with the rod member, and wherein the rod member passes through the sealing member so as to be externally exposed.

3. The transformer according to claim 1, wherein a second bobbin is provided in the first bobbin, wherein the second bobbin has an electrical insulation property and has a tube shape, wherein the secondary winding is provided around an outer circumference of the second bobbin, and wherein the core member is provided in the second bobbin.

4. A strobe device in which the transformer according to claim 1 is used as a trigger transformer in as trigger circuit.

* * * * *